July 10, 1934.  V. J. ANDREW  1,966,230
FREQUENCY MEASURING SYSTEM
Filed March 18, 1931
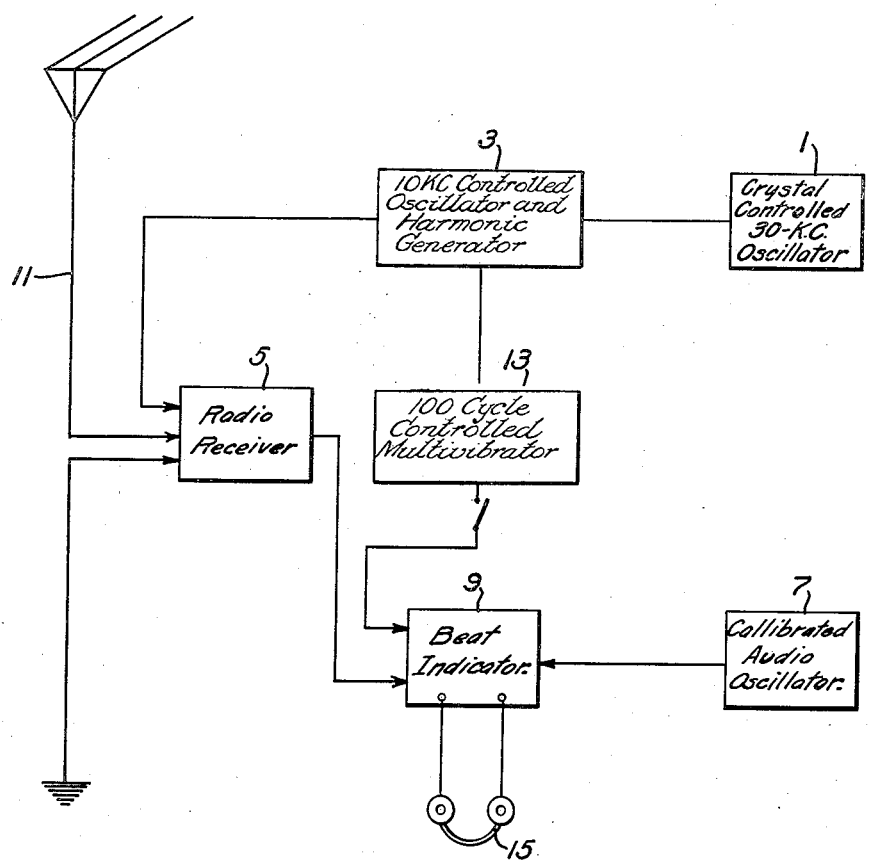
WITNESSES:
INVENTOR
Victor J. Andrew.
BY
ATTORNEY Patented July 10, 1934

1,966,230

UNITED STATES PATENT OFFICE 1,966,230

FREQUENCY MEASURING SYSTEM

Victor J. Andrew, Chicago, Ill., assignor to Westinghouse Electric & Manufacturing Company, a corporation of Pennsylvania Application March 18, 1931, Serial No. 523,482

2 Claims. (Cl. 250—39)

My invention relates to systems for measuring the frequency of oscillatory phenomena. More particularly, my invention resides in a method and apparatus for accurately indicating the frequency of oscillatory phenomena lying within the audio and radio-frequency range.

In the radio and related arts, the need often arises for quickly and accurately measuring the frequency of alternating currents and potentials employed in the operation of associated apparatus. When dealing with frequencies lying within the power-frequency range, that is of the order of 25 or 60 cycles, accurate measurement thereof presents no particular problem, these frquencies being capable of measurement by mechanical devices, such as power-frequency meters, oscillographs, etc. When, however, the frequencies to be measured extend throughout the audio-frequency range and above, the employment of mechanical measuring devices of the type mentioned is out of the question. Resort to much more sensitive means must be made in order to produce accurate results.

In many instances, where frequencies within the audio-frequency and radio-frequency range have to be measured, a high degree of accuracy is not required, and a calibrated receiver may be employed which will be sufficient for the purpose, the reading of the receiver giving an indication of the frequency received. For precision work, however, such scheme is susceptible of errors as high as 2% and is, consequently, entirely inadequate for the purpose.

A different scheme for more accurately measuring the frequency of generated oscillatory phenomenon, which scheme may be conveniently termed "zero beat method of frequency determination", comprises zero beating the unknown frequency with a continuously variable calibrated oscillator and obtaining the reading directly from the oscillator calibration. This method has its limits which are determined by the accuracy of the individual elements employed.

The "zero beat" system described above, while reasonably accurate for most purposes, is still inadequate where accuracy of the highest degree is required. For example, in measuring the frequency of a transmitted wave to determine the extent, if any, that a broadcast station has shifted from its assigned frequency, the highest degree of accuracy is required by reason of the very close limits permitted, within which the assigned frequency of a broadcast station must be maintained.

In employing the beat method of determining the frequency of a wave with such high degree of accuracy, it is essential that the error, in measuring an audio frequency known to lie between 0 and 5000 cycles, shall not exceed ½ of a cycle. Such precision and accuracy cannot be obtained through the use of a calibrated audio oscillator only, for zero beating with the unknown frequency, since it has been found practically impossible to construct an audio oscillator which would hold its calibration with the high degree of accuracy required.

It is one object of my invention to provide an improved method for frequency measuring.

Another object of my invention is to provide means whereby the frequency of oscillatory phenomena may be quickly determined with a high degree of accuracy.

Another object of my invention is to provide an improved frequency-measuring system capable of accurately measuring frequencies throughout the radio-frequency range.

Other objects of my invention will be disclosed in the following description of my method and involved system, taken in conjunction with the accompanying drawing wherein:

The figure is a diagrammatic view showing my invention as employed in a system for measuring frequencies, particularly those within the radio-frequency band.

In practicing my invention, I employ, to advantage, the zero-beat method of measuring frequencies and combine the same with additional apparatus whereby very accurate results may be obtained quickly and with ease. Broadly speaking, my object is accomplished by providing a source of standard frequencies and associating the same in a system capable of measuring the frequency of signals of unknown radio frequency. The apparatus, thus broadly referred to, is susceptible of two methods of procedure to determine the frequency of an unknown oscillatory condition with an extraordinary high degree of accuracy.

The manner in which the components of the system are associated, and the methods which may be followed in employing the system for the accurate measurement of audio signals will be fully described in conjunction with the accompanying drawing.

Referring more particularly to the drawing, I have illustrated therein the manner in which my invention may be practiced in determining or measuring frequencies lying within the radio-frequency range. The system disclosed comprises a frequency-measuring system particularly adaptable for checking up on the frequencies of broadcast stations to determine whether such stations are maintaining their assigned frequencies within the narrow limits allowed them.

The system is fully described in a copending application of Henry C. Forbes, Serial No. 476,339, filed August 19, 1930, and assigned to the Westinghouse Electric and Mfg. Company, to which application, reference is made for a complete description of the operation of the system. Briefly speaking, however, the system comprises a crystal-controlled 30-kilocycle oscillator 1, a harmonic generator 3, a radio receiver 5, a calibrated adjustable audio oscillator 7 and a beat indicator 9.

A signal to be measured is received upon the antenna circuit 11 and approximately determined by the dial indication of the radio receiver. It is then heterodyned with a known harmonic of the fundamental of the harmonic generator to produce a beat note at audio frequency. The audio frequency beat signal is then zero beat with a signal of known frequency from the calibrated audio oscillator, the reading of which will give an indication of the frequency of the incoming signal. The crystal-controlled oscillator 1 is employed to maintain the fundamental of the harmonic generator 3 at its assigned frequency, whereby increased accuracy of results may be obtained.

In adapting my invention to the system described, I provide a source of standard frequencies 13 comprising, in this instance, a multi-vibrator and associate it with the beat indicator 9. The standard frequencies consist of a fundamental of 100 cycles and all harmonics of 100 cycles up to 5000 cycles which are generated by an oscillator adjusted to generate a fundamental of 100 cycles. The oscillator may be of any type, but it has been found desirable to employ an oscillator of the multi-vibrator type, since the wave shape generated by an oscillator of this type is of such character as to provide a practically unbroken series of harmonics. The 100-cycle frequency fundamental has been adopted by reason of the fact that it is very convenient to deal with frequencies comprising multiples of 100. It should be apparent, however, that any fundamental frequency may be employed as a standard.

The arrangement of apparatus set forth is susceptible of either of two modes of procedure in determining the frequency of a signal. According to method No. 1, the source of standard frequencies 13 may be employed to calibrate the audio-frequency oscillator immediately prior to measuring the signal of unknown frequency. In following this procedure, various harmonics from the source of standard frequencies are beat with the audio-frequency oscillator 7, which is adjusted until a zero-beat indication is realized, as indicated by the absence of a beat signal in the phones 15. It can then be determined just how far off or how far out of adjustment the audio-frequency oscillator might have become since the last or preceding measuring operation, and the correction factor may be determined for any reading on the oscillator. After the oscillator has been calibrated and the correction factor determined, the source of standard frequencies may be disconnected from the beat indicator by means of any suitable switch arrangement, and the source 5 of the unknown-frequency signal may then be zero beat with the audio-frequency oscillator 7, in the same manner that the standard frequencies were zero beat. The reading on the audio-frequency oscillator, after taking into consideration the correction factor necessary, will then give an indication, with a high degree of accuracy, of the frequency of the unknown signal.

According to the method just described, the source of standard frequencies is employed as a convenient means for calibrating the audio-frequency oscillator just prior to measuring the frequency of the unknown signal. Since the accuracy of the audio-frequency-oscillator indications depends upon the accuracy of the source of standard frequencies, it is necessary that some means be provided to control the source of standard frequencies to maintain the frequency of the fundamental at its desired value. This may be accomplished either by means of a crystal control or through the use of a tuning fork or any other suitable means well known in the art. In the system disclosed, I provide for controlling the frequency of the oscillator by impressing thereon the output of the harmonic generator as a control frequency. Since the harmonic generator is stabilized by means of the crystal-controlled 30-kilocycle oscillator 1, it will be apparent that the source of standard frequencies will also be stabilized to the same extent, as if it were controlled directly from the crystal-controlled 30-kilocycle oscillator, which, of course, might be employed, if desired. Therefore, in the system described in the drawing, the crystal-controlled 30-kilocycle oscillator takes on a new function, in addition to the old functions, namely, that of controlling the frequency of this standard-frequency source, as well as the frequency of the harmonic generator.

In lieu of the procedure outlined above, in measuring the frequency of unknown signals, another method may be followed whereby it will not be necessary to calibrate the audio-frequency oscillator each time a signal is to be measured. All that is necessary is that the audio-frequency oscillator 7 indicate, by any suitable indications, the particular harmonic of the 100-cycle source with which it may, at any particular time, be zero beat. In practicing this second method for determining frequencies, the signal of unknown frequency is first heterodyned with an harmonic of the 10-kilocycle harmonic generator, and the beat note obtained is then zero beat with the audio-frequency oscillator 7, and reading on the oscillator is noted. The oscillator is then adjusted to zero beat with at least two harmonics of the 100 cycle source, one harmonic being preferably immediately above and the other immediately below the frequency of the unknown signal, and the readings also noted. The readings thus obtained will indicate the relative value of the beat frequency to that of the adjacent harmonics of 100-cycle frequency. Knowing the absolute frequency of the harmonic immediately above and immediately below that of the beat-frequency signal, it will then be possible to interpolate in such manner as to accurately determine the absolute frequency of the beat signal from which the frequency of the unknown signal may be determined or, preferably, the audio-frequency oscillator may be so calibrated that the frequency of the unknown signal may be directly determinable. Should the audio-frequency oscillator be slightly out of adjustment, the errors will be common to all the readings and will, accordingly have no effect in the results, since they are balanced out in the operation of interpolating the readings obtained. In lieu of comparing the unknown frequency with a standard frequency above and below that of the unknown frequency, it is apparent that the same result may be obtained by comparing the unknown frequency with any two or more known frequencies.

To insure accurate readings on the calibrated audio oscillator, the oscillator may be provided with a vernier adjustment capable, for example, of a variation of 100 cycles. With the provision of a vernier, very accurate adjustments may be obtained with ease, and the determination of unknown frequencies will be facilitated.

In the system described by me, a very high degree of accuracy can be obtained in the measurement of signals of unknown radio frequencies and may be employed, if desired, in the measurement of frequencies within the audio-frequency and the intermediate-frequency range.

Various modifications of my invention may suggest themselves to those skilled in the art without, in any way, departing from the principles involved. I, accordingly, do not desire to be limited to the specific details and methods described by me, except as is necessitated by the prior art and the appended claims.

I claim as my invention:

1. In frequency-measuring apparatus, means for obtaining a signal of unknown frequency which is indicative of the frequency of the signal to be determined but lower in value, means comprising an oscillation generator for measuring said unknown frequency, and means stabilized in frequency by said first mentioned means and electrically coupled to said last-mentioned means for quickly and accurately calibrating said generator.

2. In a frequency-measuring system, a frequency generator for beating with a signal of unknown frequency to obtain beat frequency of unknown value, an oscillation generator for zero beating said unknown beat frequency, a source of standard frequencies for calibrating said oscillation generator, and a single stabilizing means for controlling the frequency of said frequency generator and means including said stabilizing means for controlling the frequency of said source of standard frequencies.

VICTOR J. ANDREW.